C. LINDEMER.
MIXING VALVE.
APPLICATION FILED APR. 1, 1913.
1,220,145.
Patented Mar. 20, 1917.
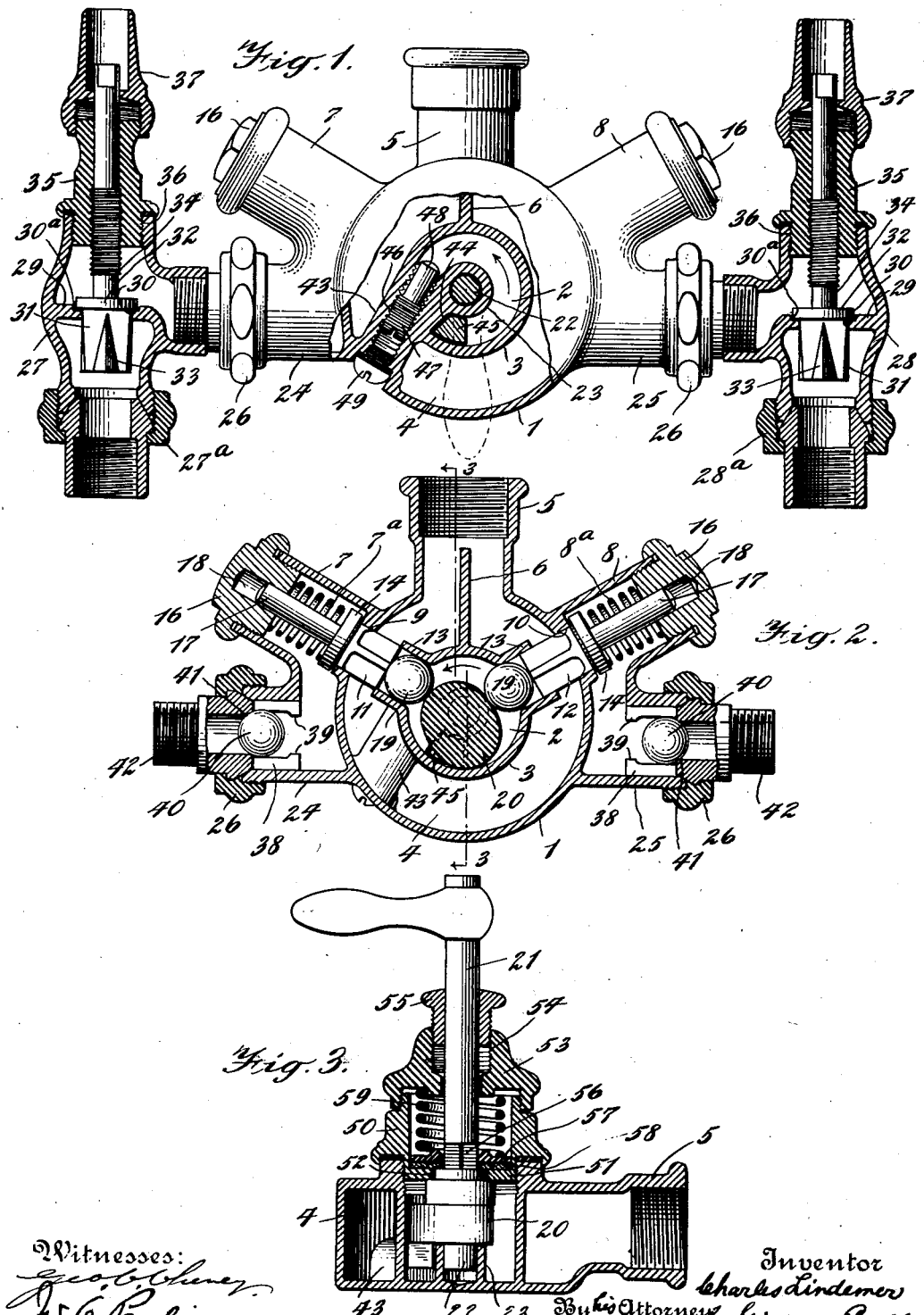
Witnesses:
Inventor
Charles Lindemer
By his Attorney

UNITED STATES PATENT OFFICE.

CHARLES LINDEMER, OF TRENTON, NEW JERSEY, ASSIGNOR TO THE J. L. MOTT IRON WORKS, A CORPORATION OF NEW YORK.

MIXING-VALVE.

1,220,145. Specification of Letters Patent. Patented Mar. 20, 1917.

Application filed April 1, 1913. Serial No. 758,135.

*To all whom it may concern:*

Be it known that I, CHARLES LINDEMER, a citizen of the United States, residing at Trenton, in the county of Mercer and State of New Jersey, have invented certain new and useful Improvements in Mixing-Valves, of which the following is a specification.

My invention relates to new and useful improvements in mixing valves of the character or type employed in connection with lavatories, shower-baths and similar apparatus. Among other objects, I desire to provide a valve in which the pressure of the hot water may be regulated so as not to overcome or retard the low pressure cold water; to provide simple and effective means for preventing change of the valve position after the same has once been set to effect the desired mixture, and for regulating the amounts of hot and cold water to produce the desired mixture. Another object is to provide improved and efficient means to insure opening of the cold water supply before admission of any hot water to the valve. Other objects will appear during the progress of the following detail description of the invention.

The invention consists in the improved construction of parts and their arrangement in operative combination to be more fully described hereinafter, and the novelty of which will be particularly pointed out and distinctly claimed.

I have fully and clearly illustrated my invention in the accompanying drawings to be taken as a part of this specification and wherein:

Figure 1 is a view in front elevation with the casing broken away to show in section the internal arrangement of parts, the other parts being shown in vertical central section.

Fig. 2 is a vertical central section through the mixing valve casing shown in Fig. 1.

Fig. 3 is a section on the line 3—3 of Fig. 2.

Referring to the drawings by characters of reference, 1 designates a main hollow casing, preferably substantially cylindrical in form, and having a central chamber 2 therein, the wall 3 of said chamber being concentric with the main casing wall and joining the heads of the casing 1 and forming with the cylindrical wall of the main casing an annular mixing chamber 4, as clearly shown in Figs. 1, 2, and 3 of the drawings.

Extending radially from the mixing valve casing 1 is an outlet member 5, communicating with the said chamber 4, a division wall 6 extending radially from the wall 3 and projecting within said outlet member 5. Extending radially from the cylindrical wall of the casing 1, and arranged on opposite sides of the outlet member 5, are valve casing members 7, 8, respectively, which communicate with the chamber 4 through openings 9, 10, as clearly shown in Fig. 2 of the drawings. Each of these casings 7, 8, contains a disk valve, said valves being shown at 11, 12, respectively, which valves have guide webs freely movable through the openings 9 and 10, said guide webs having their inner ends seated in guide bosses 13, 13, integral with the wall 3, and opening into the chamber 2. Each of these valves 11, 12, is provided with a disk head 14 coöperating with a seat constituted by the exterior wall of the chamber 1, to regulate the flow from the valve casings 7, 8 to the chamber 4, said valves being normally urged toward their seats to cut off communication between said chambers 7, 8, and the chamber 4, by expansion springs 7ᵃ, 8ᵃ, which abut the said heads 14, 14, and the closure blocks 16 threaded into the outer ends of the members 7, 8. Each valve carries a guide stem 17, seated in a seat 18, in the block 16, and capable of movement lengthwise of said seat so as to guide the movements of the valve toward and away from its seat.

Seated in each of the bosses 13, 13, is a metallic ball 19, which balls are supported on the exterior surface of an operating cam 20, and engage the inner ends of the webs of the valves 11, 12, respectively, and form the operative connection between said cam and the valves 11, 12, the arrangement being such that rotation of the cam operates on said balls to push them outward through the bosses to force the valves from their seats and establish communication between the chambers 7, 8, and the chamber 4. This rotary cam is mounted on a valve stem or spindle 21 having a stud bearing 22 projecting within a bearing socket 23 carried by one of the end walls of the casing 1. As shown in Fig. 2 of the drawings. It will be seen that this cam is substantially elliptical in cross section, and is mounted eccentrically on the said spindle, with its axis of rotation off both the transverse and longitudinal axis of the ellipse, and in such manner that, when rotated, said valve will first operate to open the valve 12 without moving the valve 11, and, upon further rotation, will open the valve 11, so that both valves permit flow from the casings 7, 8, to the mixing chamber 4.

The casing 1 is provided with laterally-extending inlet nipples or coupling members 24, 25, which communicate with the chamber 4 through the chambers 7, 8, and valve openings 9, 10.

The members 24 and 25 are adapted to be connected respectively, by suitable couplings 26, 26, with valve casings 27, 28, the said valve casing 27 being connected by a coupling 27$^a$ to a source of hot water supply and the casing 28 being connected by a coupling 28$^a$ to a source of cold water supply. Each of the valve casings 27, 28, is provided with an internal transverse web 29 having a valve opening 30 surrounded by a valve seat 30$^a$. Movable through each valve opening 30, and adapted to coöperate with the seat 30$^a$, is a valve 31 having a head flange or disk 32 to coöperate with said seat 30$^a$, the body of the valve being substantially cylindrical in general contour and having triangular notched passages 33 which taper from the lower end of the valve toward the said head flange or disk. Each valve has connected thereto an operating stem 34 threaded through a packing nut 35, which is threaded into the valve casing, as at 36, a protecting and covering nut 37 being threaded onto the outer end of the packing nut 35 and surrounding the said stem 34. By this arrangement I am able to regulate the amount of water supplied to the mixing valve from the hot and cold water supply sources, and the flow from said sources may be so regulated relative to each other that the pressure of the hot water on the mixing valve side of the hot water valve 31 is reduced in amount to permit proper mixture with the cold water which is usually delivered to the mixing valve at lower pressure than the hot water.

Each of the coupling nipples 24, 25, is provided with longitudinally- and inwardly-extending guide ribs 38 having at their inner ends shoulders 39 which support and guide a ball check valve 40, which coöperates with a seat 41 in a nipple 42, which connects the valve casings 27 and 28 with said coupling nipples 24, 25, the movement of the ball valve 40 away from its seat being limited by the said shoulders 39. These ball check valves are highly sensitive and act quickly and effectively to prevent back pressures, should any exist, from causing the water in the mixing valve to flow back into either the hot or cold water supply pipes.

Means is provided for limiting rotation of the operating cam in one direction so that the springs operating the valves 11 and 12 will operate to effectively close the openings controlled by said valves, and to limit its movement in the opposite direction in order that the opening movement of the hot water valve 11 will be limited so that a determined relation between the supply of hot and cold water will be maintained. This means consists of a cylindrical web 43, preferably cast integral with the mixing valve casing 1, and connecting the socket-piece 23, the wall 3, and the outer wall 1 of the casing. This web, as shown in Fig. 1, presents a stop face 44, which is arranged in the path of movement of a lug 45 connected to the operating cam 20, and projecting into the annular space between the socket bearing 23 and the wall 3, and movable through said space. By engagement of said stop or lug 45 with the stop face 44, the movement of the cam to permit closing movement of the valves 11 and 12 is limited, so that the springs may throw the valves into closed position. Extending through the cylindrical web 43 is a threaded passage 46, in which is arranged a stop screw 47, the inner end 48 of which may be projected within the space between the bearing socket 23 and the wall 3, and constitutes an adjustable stop to be engaged by the said lug 45, to limit rotation of the cam in the direction to open the valves 11 and 12. By virtue of the threaded connection between the stop 48 and the web 43, the exact point at which the opening movement of the cam is stopped may be accurately regulated. The adjustability of the stop is important because it provides for the regulation of the amount of hot water necessary to be supplied to produce a mixture of the desired temperature with the cold water, the temperature of which varies at different times of the year; that is, the stop may be adjusted to increase or decrease supply of hot water accordingly as the temperature of the cold water is high or low. I preferably close the outer end of the passage 46 with a closure screw or plug 49, so as to prevent access of dirt or other foreign matter to the outer end of the passage 46.

I provide a simple and effective means for holding the operating cam fixed in any position to which it may be moved in operating the valves 11 and 12, which means will now be described.

The end wall or face of the casing 1 opposite to that carrying the socket bearing 23 is closed by a packing nut or socket member 50 threaded into the said casing 1, and having a web 51 provided with a central aperture 52, through which extends the stem or operating shaft 21 carrying the cam 20. The upper end of the packing nut or socket 50 is closed by a removable cap 53 having a threaded socket 54 surrounding the stem 21, and adapted to receive the packing nut 55, all as shown in Fig. 3 of the drawings. At a point adjacent the web 51, the stem 21 is provided with an angular or square-faced portion 56, carrying a friction-plate 57, having a central opening shaped to conform to the said portion 56, so as to rotate with the shaft 21. This friction-plate or washer is movable longitudinally of the shaft 21 to frictionally engage a fiber friction washer or plate 58, supported on the web 51, this movement of the friction-plate being caused by an expansion spiral spring 59 surrounding the shaft 21 and exerting its force expansibly against the cap 53, and said friction-plate. By the provision of this friction means constituting in effect a lock for the cam-operating shaft the cam is held in adjusted position, and the pressure exerted by the springs through the valves 11 and 12 and the balls 19 on the cam is prevented from rotating the cam.

The operation of the embodiment of the invention above described, and as shown in the drawings, is briefly as follows: The parts being in the relative positions shown in Figs. 1 and 2, under which conditions the valves 11 and 12 are in closed position, upon rotating the operating-cam in the direction of the arrow in Figs. 1 and 2, the first effect will be to open the valve 12 controlling the cold water supply without causing any opening movement of the valve 11, controlling the hot water supply. This will permit cold water to flow to the mixing chamber, and thence out of the outlet 5, which may lead to any suitable point. Upon further movement of the cam, the valve 12 will be held open and the hot water valve will be gradually opened to admit hot water to the mixing chamber. This movement of the cam may be continued, gradually increasing the supply of hot water until the desired temperature of the mixture is reached, or until the opening movement of the cam is stopped by engagement of the lug 45 with the inner end of the stop screw 48.

It will be understood that the positions of the valves 31, 31, are regulated so that the proper amount of water from each of the supplies will be admitted to the casing, final adjustment of these valves being dependent upon the temperature and pressure of the supplies, it being understood that the hot water supply, being usually at higher pressure than the cold water supply, the valve controlling the flow thereof would be regulated to reduce the area of the opening controlled by the hot water valve below the area of the opening controlled by the cold water valve. It will, however, be understood that these valves 31 are regulable to suit all conditions of pressure and temperature of the hot and cold water to the mixing valve.

The angular notched passages 33 which taper from the lower end of each of the valves 31 toward the disk thereof, permit of a fine regulation of the amounts of water permitted to flow from the hot and cold supplies to the mixing valves.

What I claim and desire to secure by Letters Patent of the United States is:—

1. In a valve of the character described, an outer mixing chamber, inlets to the mixing chamber for hot and cold water, spring operated valves controlling the flow through said inlets, an inner chamber, a rotary cam in said inner chamber for moving said valves to open position, a lug on the cam, a stop in said inner chamber in the path of the lug to limit rotation of the cam in a direction to permit the valves to close, and an adjustable stop in said inner chamber to limit rotation of the cam in a direction to open the valves.

2. In a valve of the character described, a casing comprising inner and outer concentric walls forming an annular mixing chamber and an inner chamber, inlets through said outer wall for hot and cold water, spring-actuated valves coöperating with the said inlets, a cam in the inner chamber having engagement with said valves to move the same to open position, a part bridging the mixing chamber and having a passage therethrough opening into the inner chamber, and a stop threaded through said opening and adapted to be projected within the inner chamber to limit rotation of the cam in opening the valves.

3. In a valve of the character described, a mixing chamber, inlets to said chamber for hot and cold water, spring operated valves controlling the flow through the inlets, a rotary cam for opening the valves, a tubular member constituting a stationary stop limiting movement of the cam in one direction, and a screw stop projecting from said tubular member to limit movement of the cam in the opposite direction.

4. In a valve of the character described, a casing divided into an inner chamber and a concentric mixing chamber, inlets to the mixing chamber, spring pressed valves controlling the inlets and extending into the inner chamber, a rotary cam in the inner chamber adapted to open the valves, a web extending across the mixing chamber into the inner chamber to constitute a stop limiting movement of the cam in one direction, and a stop for limiting movement of the cam in the opposite direction adjustably mounted on said web.

5. In a valve of the character described, a mixing chamber having inlets for hot and cold water, spring operated valves for controlling said inlets, a rotary cam for moving said valve to open position, an operative shaft for said cam projecting through the mixing chamber, threads formed in a wall of the mixing chamber surrounding the shaft, a socket member threaded into said threaded wall, a friction plate secured to the shaft and bearing against the inner wall of the socket member, a spring in the socket member and engaging the friction plate, and a removable cap for the socket member.

In testimony whereof I have hereunto signed my name in the presence of two subscribing witnesses.

CHARLES LINDEMER.

Witnesses:
 FRED S. BILES,
 C. E. INSLEY.